| (12) United States Patent | (10) Patent No.: US 7,345,294 B2 |
| Ogawa | (45) Date of Patent: Mar. 18, 2008 |

(54) SOLID STATE RADIATION DETECTOR HAVING VARIABLE WIDTH LINEAR ELECTRODES

(75) Inventor: Masaharu Ogawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 172 days.

(21) Appl. No.: 11/238,038

(22) Filed: Sep. 29, 2005

(65) Prior Publication Data

US 2006/0065864 A1    Mar. 30, 2006

(30) Foreign Application Priority Data

Sep. 29, 2004    (JP)    ............................. 2004-284510

(51) Int. Cl.
*G01N 23/04*    (2006.01)

(52) U.S. Cl. ..................................... 250/591

(58) Field of Classification Search ................. 250/591
See application file for complete search history.

(56) References Cited

U.S. PATENT DOCUMENTS 6,518,575 B1    2/2003 Imai
6,590,224 B2*    7/2003 Imai .......................... 250/591
6,770,901 B1    8/2004 Ogawa et al.
2002/0148989 A1*    10/2002 Imai .......................... 250/591

FOREIGN PATENT DOCUMENTS

JP    2000-105297 A    4/2000

\* cited by examiner

*Primary Examiner*—David Porta
*Assistant Examiner*—Jessica L Eley
(74) *Attorney, Agent, or Firm*—Sughrue Mion, PLLC

(57) ABSTRACT

A solid state radiation detector having a sub-striped electrode is provided, which is capable of effectively erasing residual images accumulating in the region adjacent to the outer edge of the first conductive layer. The detector has a planar first conductive layer; a recording photoconductive layer; a charge transport layer; a reading photoconductive layer; a striped electrode composed of multitudes of linear elements; and a sub-striped electrode composed of multitudes of linear elements. The element partly lying in the image detection area is formed to have a greater width in the non-image-detection area than in the image detection area. In addition, the element entirely lying in the region outside of the image detection area is formed to have a greater width than the width in the image detection area of the element partly lying in the image detection area.

9 Claims, 4 Drawing Sheets

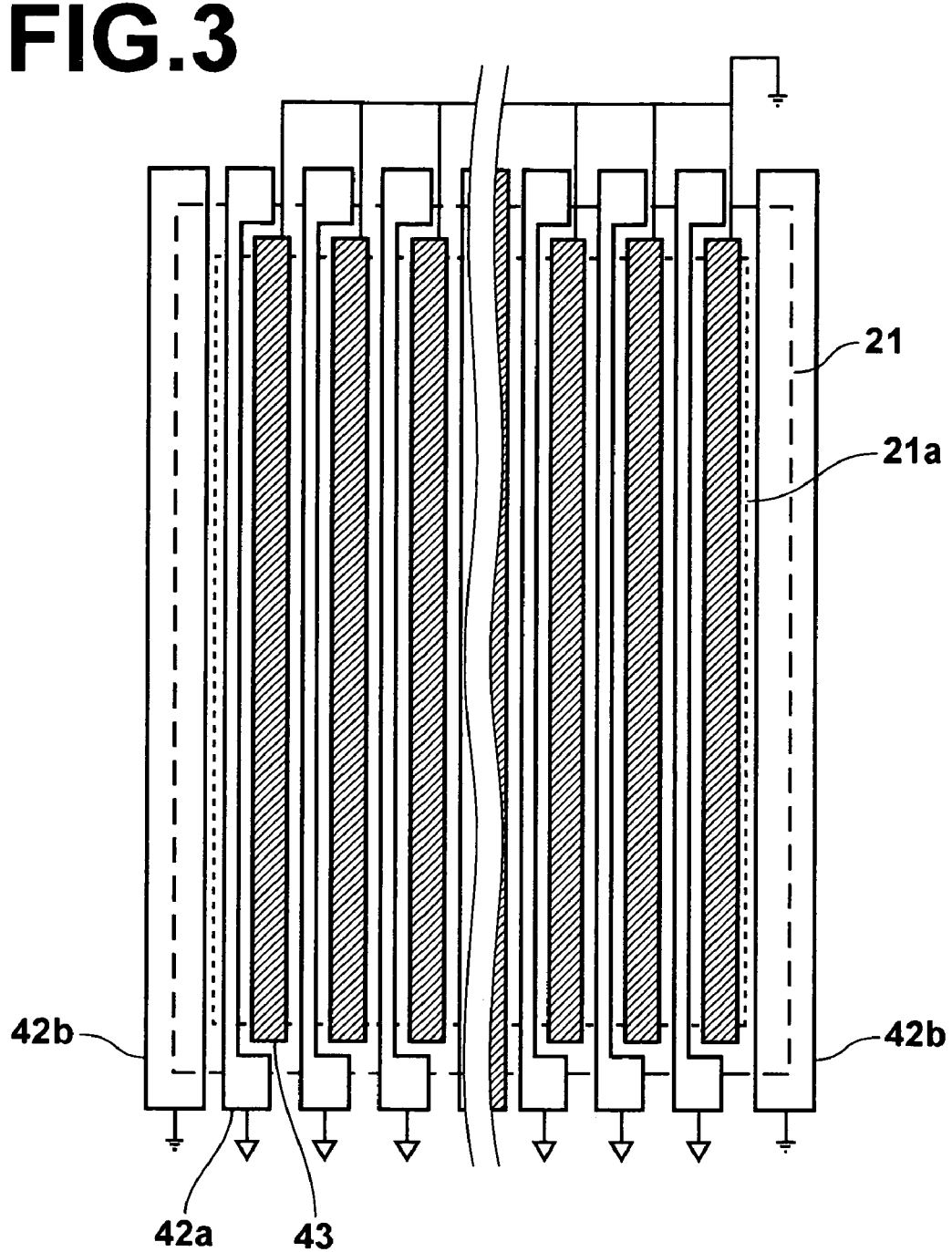

SOLID STATE RADIATION DETECTOR HAVING VARIABLE WIDTH LINEAR ELECTRODES

BACKGROUND OF THE INVENTION

1. Field of the Invention

The present invention relates to a solid state radiation detector having a storage section for storing an amount of electric charges as latent image charges that corresponds to the amount of radiation irradiated or light emitted through excitation by the radiation.

2. Description of the Related Art

Today, various types of radiation image information recording/reading systems that employ a solid state radiation detector (hereinafter also referred to as simply "detector") are proposed in the field of radiation imaging for medical diagnosis. The detector temporarily stores in its storage section electric charges as latent image charges obtained by detecting radiation, and outputs electrical signals by converting the latent image charges. Various types of detectors are proposed as the solid state detector for use in the system. From the aspect of charge readout process for reading out charges stored in the detector, the detectors may be classified into one of the types called the optical reading type in which the charges are read out by emitting reading light (reading electromagnetic wave) on the detector.

Such type of detector is proposed by the applicant as the optical reading type solid state radiation detector having high reading response and efficient signal charge extraction capabilities, as described in Japanese Unexamined Patent Publication No. 2000-105297 and U.S. Pat. Nos. 6,770,901 and 6,518,575. The detector has a set of layers layered in the order of: a planar first conductive layer which is transparent to recording radiation or light emitted through excitation by the recording radiation (hereinafter referred to as "recording light"); a recording photoconductive layer that shows conductivity when exposed to recording light; a charge transport layer that acts as substantially an insulator against charges having the same polarity as the charges charged on the first conductive layer and as substantially a conductor for the charges having the opposite polarity; a reading photoconductive layer that shows conductivity when exposed to reading light; a second conductive layer which is transparent to reading light. The layer composite has a storage section formed between the recording photoconductive layer and charge transport layer for storing latent image charges (electrostatic latent image) carrying image information.

The solid state radiation detector proposed by the applicant in U.S. Pat. Nos. 6,770,901 and 6,518,575, in particular, uses a striped electrode composed of multitudes of charge detecting linear electrodes which are transparent to reading light as the electrode of the second conductive layer having transparency to reading light. In addition, the detector further has multitudes of auxiliary electrodes for outputting an amount of electrical signals corresponding to the amount of latent image charges stored in the storage section. The auxiliary electrodes are opaque to reading light and installed in the second conductive layer such that they are disposed alternately and substantially parallel to the charge detecting linear electrodes.

By providing a sub-striped electrode made of the multitudes of auxiliary linear electrodes in the second conductive layer, a capacitor is newly formed between the storage section and sub-striped electrode. This allows the transport charges having opposite polarity to the latent image charges stored in the storage section by the recording light to be charged also on the sub-striped electrode through the charge rearrangement process at the time of reading. This may reduce the amount of transport charges to be allocated to the capacitor formed between the striped electrode and storage section through reading photoconductive layer compared with the case where no such sub-striped electrode is provided. Consequently, the amount of signal charges which may be extracted from the detector to the outside is increased and the reading efficiency is improved, resulting in high reading response and efficient signal charge extraction capabilities.

In the mean time, in the solid state radiation detector described above, a high voltage is applied between the planar first conductive layer and second conductive layer having the striped electrode and sub-striped electrode when latent image charges are recorded. At that time, the electric fields concentrate on the edge of the planar first conductive layer, so that it is difficult to evenly distribute the electric fields on the entire recording surface of the solid state radiation detector at the time of recording.

If the electric fields are unevenly distributed on the recording surface of the solid state radiation detector, artifacts may result. Currently, therefore, it is customary that a certain predetermined width extending inwardly from the outer edge of the first conductive layer is defined as the non-image-detection area, and only the further inner region is used as the image detection area in order to avoid the effects of the electric field concentration.

Further, for the solid state radiation detector described above, after an electrostatic latent image is recorded and read out from the detector, it is customary to irradiate erasing light to erase residual images remaining in the detector for the subsequent recording. The edge of the conductive layer receives highly concentrated electric fields at the time of recording, so that the region adjacent to the outer edge of the first conductive layer has more residual images than on the image detection area. Thus, the residual images in the region adjacent to the outer edge of the first conductive layer may remain even after the residual image erasing process is performed. Consequently, more residual images are accumulated as the detector is repeatedly used, which may invade the image detection area and cause artifacts to be developed even on the image detection area.

The solid state radiation detector having the sub-striped electrode for increasing reading efficiency, in particular, the phenomenon described above is significant, since erasing light is not incident on the region above the sub-striped electrode because of its opaqueness to light, and most part of the residual images formed on the region remains even after the residual image erasing process is performed.

Of course, the problem described above may be alleviated by broadening the non-image-detection area, but the solid state radiation detector having the widest possible image detection area to the size of the detector is desired. Thus, in considering the narrower trimming region, broadening the non-image-detection area is unrealistic.

SUMMARY OF THE INVENTION

The present invention has been developed in view of the circumstances described above, and it is an object of the present invention to provide a solid state radiation detector having a sub-striped electrode, which is capable of effectively erasing residual images accumulating in the region adjacent to the outer edge of the first conductive layer.

The solid state radiation detector of the present invention is a solid state radiation detector comprising a set of layers layered in the order of:

a first conductive layer which is transparent to recording light;

a recording photoconductive layer that shows photoconductivity when exposed to recording light;

a storage section that stores charges as latent image charges in accordance with the luminous energy of recording light;

a reading photoconductive layer that shows photoconductivity when exposed to reading light; and a second conductive layer having a plurality of charge detecting linear electrodes, and a plurality of auxiliary linear electrodes, wherein:

when viewed from the layering direction, a region having a predetermined width extending inwardly from the outer edge of the first conductive layer is defined as the non-image-detection area, and a region other than the non-image-detection area of the first conductive layer is defined as the image detection area;

the charge detecting linear electrodes and auxiliary linear electrodes are disposed alternately in the image detection area; and the charge detecting linear electrode partly lying in the image detection area is formed such that the width in the non-image-detection area or in the region adjacent to the outer edge of the first conductive layer is greater than in the image detection area.

Here, as for the "recording light", any electromagnetic wave, such as light, radiation, or the like, carrying image information may be used, as long as it is capable of recording the image information on a solid state detector as latent image charges (electrostatic latent image) when irradiated on the detector.

As for the "reading light", any electromagnetic wave, such as light, radiation, or the like, may be used, as long as it is capable of generating electric currents in accordance with latent image charges (electrostatic latent image) recorded on a solid state detector when irradiated on the detector.

The referent of "charge detecting linear electrodes" as used herein means the electrodes for detecting charge pairs produced in the reading photoconductive layer. Preferably, the charge detecting linear electrodes are transparent to the reading light so that the reading light may incident on the reading photoconductive layer. But they are not necessary transparent to the reading light if sufficient charge pairs are produced in the reading photoconductive layer by the reading light passed through the gaps between the linear electrodes.

The referent of "auxiliary linear electrodes" as used herein means the electrodes for outputting electric currents in proportion to the amount of latent image charges stored in the storage section. Preferably, the auxiliary linear electrodes are opaque to the reading light. But they are not necessarily opaque to the reading light, when shading films or the like which are opaque to the reading light are provided between them and a reading light irradiating means. Here, "opaque" means not only blocking the reading light entirely and producing no charge pairs, but also includes having certain transparency to the reading light and producing certain amount of charge pairs that cause substantially no problem. Thus, the charge pairs may be produced in the reading photoconductive layer not only by the reading light transmitted through the charge detecting linear electrodes or the gaps between the linear electrodes, but also by a small amount of the reading light transmitted through the auxiliary linear electrodes.

The referent of "charge detecting linear electrode partly lying in the image detection area is formed such that the width in the non-image-detection area or in the region adjacent to the outer edge of the first conductive layer is greater than in the image detection area" means that the residual image erasing effect is substantially improved in the region adjacent to the outer edge of the first conductive layer by making the width greater in the region outside of the image detection area than in the image detection area compared with the case in which the electrode has the same width both in the image detection area and the outside thereof. More specifically, the residual image erasing effect may be improved if the width in the region outside of the image detection area is 1.3 times, more preferably 2.0 times as wide as that in the image detection area.

In recording or reading out a radiation image using the solid state detector of the present invention, the radiation image recording or reading method and apparatus that use a conventional solid state detector that does not employ the present invention as described, for example, in U.S. Pat. No. 6,770,901 may be used without any modification.

Preferably, in the solid state radiation detector of the present invention, the charge detecting linear electrode entirely lying in the region outside of the image detection area is formed to have a greater width than the width in the image detection area of the charge detecting linear electrode partly lying in the image detection area.

The solid state radiation detector of the present invention comprises a set of layers layered in the order of: a first conductive layer which is transparent to recording light; a recording photoconductive layer that shows photoconductivity when exposed to recording light; a storage section that stores charges as latent image charges in accordance with the luminous energy of recording light; a reading photoconductive layer that shows photoconductivity when exposed to reading light; and a second conductive layer having a plurality of charge detecting linear electrodes, and a plurality of auxiliary linear electrodes. When viewed from the layering direction, a region having a predetermined width extending inwardly from the outer edge of the first conductive layer is defined as the non-image-detection area, and a region other than the non-image-detection area of the first conductive layer is defined as the image detection area, and the charge detecting linear electrodes and auxiliary linear electrodes are disposed alternately in the image detection area. Further, the charge detecting linear electrode partly lying in the image detection area is formed such that the width in the non-image-detection area or in the region adjacent to the outer edge of the first conductive layer is greater than in the image detection area. When erasing residual images in the solid state radiation detector by irradiating erasing light to the detector, only residual images in the region above the charge detecting linear electrode which is transparent to the erasing light may be erased, while the residual images in the region above the auxiliary linear electrode or between the electrodes may be hardly erased. The configuration of the charge detecting linear electrodes described above, however, allows residual images in the non-image-detection area or in the region adjacent to the outer edge of the first conductive layer to be erased effectively, and artifacts arising from the residual images may be prevented from developing.

Further, the charge detecting linear electrode entirely lying in the region outside of the image detection area is formed to have a greater width than the width in the image detection area of the charge detecting linear electrode partly lying in the image detection area. This allows residual images in the region outside of the image detection area to be erased effectively, and artifacts arising from the residual images may be further prevented from developing.

BRIEF DESCRIPTION OF THE DRAWINGS

FIG. 3 is a top view of the solid state radiation detector according to another embodiment of the present embodiment, illustrating only the first and second conductive layers of the detector.

DESCRIPTION OF THE PREFERRED EMBODIMENTS

Figure 1:
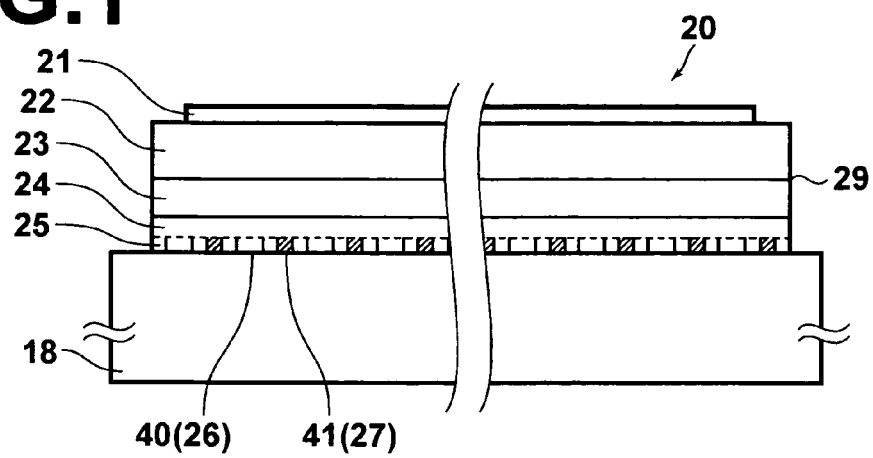
FIG. 1 is a side view of the solid state radiation detector according to an embodiment of the present invention.
Figure 2:
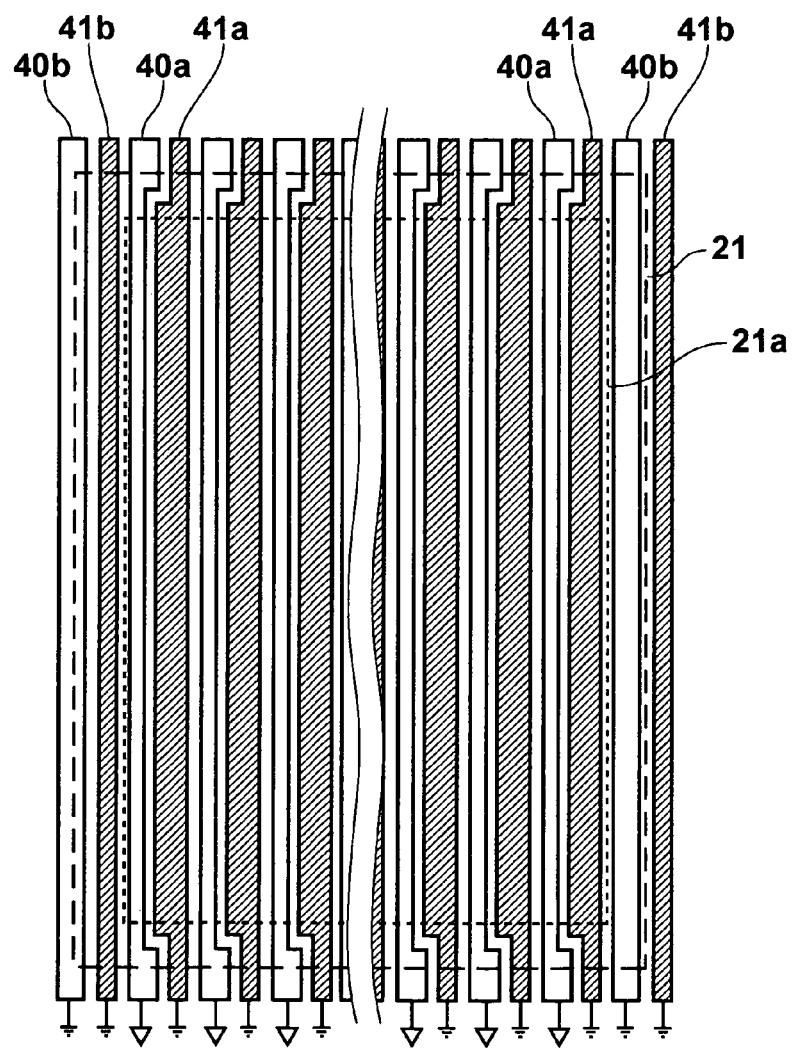
FIG. 2 is a top view of the solid state radiation detector shown in FIG. 1, illustrating only the first and second conductive layers of the detector.

Hereinafter embodiments of the present invention will be described with reference to the accompanying drawings. FIG. 1 is a side view of the solid state radiation image detector of the present invention. FIG. 2 is a top view of the detector illustrating only the first and second conductive layers (striped and sub-striped electrodes) to show the positional relationship between them.

The solid state radiation detector 20 has a set of layers layered in the order of: a planar first conductive layer 21 which is transparent to recording light (radiation or light emitted through excitation by the radiation) carrying radiation image information, such as the X-rays transmitted through a subject; a recording photoconductive layer 22 that produces charge pairs and shows conductivity when exposed to recording light transmitted through the first conductive layer 21; a charge transport layer 23 that acts as substantially an insulator against the charges of the charge pairs having latent image polarity (e.g. negative) and as substantially a conductor for the charges of the charge pairs having transport polarity (positive in this case) which is opposite to the latent image polarity; a reading photoconductive layer 24 that produces charge pairs and shows conductivity when exposed to reading light; a second conductive layer having a striped electrode 26 and a sub-striped electrode 27; and a base which is transparent to reading light. A storage section 29 is formed at the interface between the recording photoconductive layer 22 and charge transport layer 23, which is distributed two-dimensionally and stores charges having latent image polarity that carry image information produced in the recoding photoconductive layer 22.

As described earlier, a predetermined width extending inwardly from the edge (indicated by a long-dashed line) of the first conductive layer 21 is defined as the non-image-detection area (area between the long-dashed and short-dashed lines), and the further inner region from the non-image-detection area is defined as the image detection area 21a (area enclosed by the short-dashed line) in order to avoid the residual image effects arising from the electric field concentration on the edge of the first conductive layer 21 as shown in FIG. 2.

As for the base 18, a glass substrate which is transparent to the reading light or the like may be used. Preferably, a material having a coefficient of thermal expansion which is relatively close to that of the material of the reading photoconductive layer 24 is used as the base material, as well as transparent to the reading light. For example, if a-Se (amorphous selenium) is used as the material of the reading photoconductive layer 24, a material having a coefficient of thermal expansion of preferably in the range from 1.0 to $10.0 \times 10^{-5}$/K at 40 degrees Celsius, more preferably in the range from 4.0 to $8.0 \times 10^{-5}$/K at 40 degrees Celsius is used, taking into account that the coefficient of thermal expansion of Se is $3.68 \times 10^{-5}$/K at 40 degrees Celsius. Materials having a coefficient of thermal expansion that falls within the range described above include organic polymers, such as polycarbonate, polymethyl methacrylate (PMMA), and the like. Using such materials allows matching in thermal expansion between the base 18 as the substrate and the reading photoconductive layer 24 (Se film). This may prevent the problem of breakage due to the difference in thermal expansion between them, including physical separation of the reading photoconductive layer 24 from the based 18, tearing of the reading photoconductive layer 24, or cracking of the base 18 due to thermal stresses developed at the interface between them under extraordinary severe environmental conditions in which the detector is exposed to large temperature cycling, such as during transportation by vessel under frigid weather conditions. Further, organic polymer materials are advantageous over a glass substrate in that they are capable of tolerating greater impact shocks.

As for the material of recording photoconductive layer 22, a photoconductive material that consists primarily of at least one of the materials selected from the group of a-Se (amorphous selenium), lead oxide (II), such as PbO, $PbI_2$ and the like or lead iodide (II), $Bi_{12}$ (Ge, Si), $O_{20}$, $Bi_2I_3$/organic polymer nanocomposite, and the like is preferable.

As for the material of the charge transport layer 23, materials having a greater difference in charge mobility between the negative charges charged on the first conductive layer 21 and the opposite positive charges (for example, not less than $10^2$, more preferably, not less than $10^3$), are preferable. These materials include organic compounds such as poly N-vinylcarbazole (PVK), N,N'-diphenyl-N,N'-bis(3-methylphenyl)-[1,1'-biphenyl]-4,4'-diamine(TPD), discotic liquid crystal, and the like, or semiconductor materials such as TPD-dispersed polymers (polycarbonate, polystyrene, PUK), a-Se doped with 10 to 200 ppm of Cl, and the like. In particular, the organic compounds (PVK, TPD, discotic liquid crystal, and the like) are preferable, since these materials are insensitive to light. Moreover, these materials have generally a small dielectric constant, resulting in small capacitance of the capacitor formed between the charge transport layer 23 and reading photoconductive layer 24 and increased signal extraction efficiency at the time of signal reading. The referent of "insensitive to light" as used herein means that the material shows practically no conductivity when exposed the recording or reading light.

As for the material of the reading photoconductive layer 24, a photoconductive material that consists mainly of at least one of the materials selected from the group of a-Se, Se—Te, Se—As—Te, nonmetal phthalocyanine, metal phthalocyanine, MgPc (Magnesium phthalocyanie), VoPc (phase II of Vanadyl phthalocyanine), CuPc (Cupper phthalocyanine), and the like is preferable.

Preferably, the thickness of the recording photoconductive layer 22 is in the range from 50 µm to 1000 µm in order for the recording light to be fully absorbed.

Preferably, the total thickness of the charge transport layer 23 and reading photoconductive layer 24 is ½ of that of the recording photoconductive layer 22. Further, the thinner the total thickness, the faster the response at the time of reading. Thus, the total thickness is preferable to be, for example, ⅒, and more preferably ⅟₁₀₀ of that of the recording photoconductive layer 22. In the present embodiment, the thickness of the reading photoconductive layer 24 is 10 µm.

The materials of the respective layers described above are example materials suitable for the detector in which negative charges are charged on the first conductive layer 21 and positive charges on the second conductive layer 25 to store negative charges as the charges of the latent image polarity in the storage section 29 formed at the interface between the recording photoconductive layer 22 and charge transport layer 23, and to allow the charge transport layer 23 to act as what is known as the hole transport layer in which the mobility of positive charges as the charges of transport polarity is greater than that of the negative charges as the charges of the latent image polarity. The charge polarities may be switched between the first and second conductive layers, in which case only minor modifications, such as the modification of the charge transport layer to act as an electron transport layer instead of a hole transport layer, and the like, are required.

For example, a-Se, lead oxide (II), or lead iodide (II) may also be used in this case as the material of the recording photoconductive layer 22, and as for the charge transport layer 23, N-trinitrofluorenylidene-aniline(TNFA) dielectric, trinitrofluorenon(TNF)-dispersed polyester, or asymmetric diphenoquinon derivative is suitable. Further, the nonmetal phthalocyanine, or metal phthalocyanine described above may also be used as the material of the reading photoconductive layer 24.

As for the material of the first conductive layer 21, any material having transparency to the recording light may be used. For example, in order to make it transparent to visible light, a nesa film (SnO2) or ITO (Indium Tin Oxide) known as the transparent thin metal film, or a metal oxide, such as IDIXO (Indemitsu Indium X-metal Oxide; Idemitsu Kosan Co., Ltd.), which is a transparent metal oxide of amorphous state that allows ease of etching, or the like may be used with the thickness in the range from around 50 to around 200 nm, and more preferably, 100 nm or more. Alternatively, a pure metal, such as aluminum (Al), molybdenum (Mo), chromium (Cr), or the like, may be made transparent to visible light by making it as thin as, for example, 20 nm or less (preferably around 10 nm). If an X-ray is used as the recording light to record an image on the detector by irradiating the X-ray from the side of the first conductive layer 21, a pure metal, such as Al, Au, or the like, with the thickness of, for example, 100 nm may be used as the material of the first conductive layer 21, since it does not need to be transparent to visible light in this case.

The second conductive layer 25 has a striped electrode 26 formed of multitudes of elements (charge detecting linear electrodes) 40 disposed in stripes, which are transparent to reading light; and a sub-striped electrode 27 formed of multitudes of elements (auxiliary linear electrodes) 41 disposed in stripes, which are opaque to the reading light. Each of the elements 40 and 41 is arranged such that they are disposed alternately and in parallel with each other. Further, the striped electrode 26 is electrically insulated from the sub-striped electrode 27. The sub-striped electrode 27 is a conductive member for outputting electrical signals in proportion to the amount of latent image charges stored in the storage section 29 formed at the interface between the recording photoconductive layer 22 and charge transport layer 23.

Here, as the electrode material of each element 40 of the striped electrode 26, ITO (indium Tin Oxide), IDIXO (Indemitsu Indium X-metal Oxide; Idemitsu Kosan Co., Ltd.), aluminum, or molybdenum may be used. As the electrode material of each element 41 of the sub-striped electrode 27, aluminum, molybdenum, chromium, or the like may be used.

As shown in FIG. 2, an element 40a partly lying in the image detection area 21a has a greater width in the non-image-detection area than in the image detection area 21a. Due to this, the element 41a disposed adjacent to the element 40a has a smaller width in the non-image-detection area than in the image detection area.

An element 40b entirely lying in the region outside of the image detection area 21a has a greater width than that in the image detection area 21a of the element 40a partly lying in the image detection area 21a.

In the detector 20, a capacitor $C_{*a}$ is formed by sandwiching the recording photoconductive layer 22 between the first conductive layer 21 and storage section 29. Further, a capacitor $C_{*b}$ is formed by sandwiching the charge transport layer 23 and reading photoconductive layer 24 between the storage section 29 and striped electrode 26 (element 40), as well as a capacitor $C_{*c}$ by sandwiching the reading photoconductive layer 24 and charge transport layer 23 between the storage section 29 and sub-striped electrode 27 (element 41). The amounts of positive charges $Q_{+a}$, $Q_{+b}$ and $Q_{+c}$ respectively allocated to the capacitor $C_{*a}$, $C_{*b}$ and $C_{*c}$ in the charge rearrangement process at the time of reading are proportional to the capacitance $C_a$, $C_b$ and $C_c$ of the capacitors with the total amount $Q_+$ is equal to the amount of charges $Q_-$ of the latent image polarity. These relationships may be expressed by the following formulae.

$$Q_- = Q_+ = Q_{+a} + Q_{+b} + Q_{+c}$$

$$Q_{+a} = Q_+ \times C_a/(C_a + C_b + C_c)$$

$$Q_{+b} = Q_+ \times C_b/(C_a + C_b + C_c)$$

$$Q_{+c} = Q_+ \times C_c/(C_a + C_b + C_c)$$

The amount of signal charges which may be extracted from the detector 20 is equal to the sum of the $Q_{+a}$ and $Q_{+c}$ ($Q_{+a} + Q_{+c}$) allocated to the capacitors $C_{*a}$ and $C_{*c}$, and positive charges allocated to the capacitor $C_{*b}$ are not extracted as the signal charges (reference will be directed to U.S. Pat. No. 6,770,901 for further information).

Now, looking at the capacitance of the capacitors $C_{*b}$ and $C_{*c}$ formed by the striped electrode 26 and sub-striped electrode 27. The capacitance ratio $C_b:C_c$ corresponds to width ratio $W_b:W_c$ of each element 40 and 41. In the mean time, addition of the sub-striped electrode does not give any significant impact on the capacitance $C_a$ of the capacitor $C_{*a}$ and the capacitance $C_b$ of the capacitor $C_{*b}$, and they remain substantially unchanged.

As a result, less amount of positive charges $Q_{+b}$ is allocated to the capacitor $C_{*b}$ in the charge rearrangement process at the time of reading compared with the case without the sib-striped electrode 27. Consequently, more amount of signal charges may be read out from the detector 20 through the sub-striped electrode 27 by that much compared with the case without the sub-striped electrode 27.

In the solid state radiation detector according to the present embodiment, the element 40a partly lying in the image detection area 21a has a greater width in the non-image-detection area than in the image detection area 21a. This allows residual images in the non-image-detection area to be erased effectively, and artifacts arising from the residual images may be prevented from developing.

Further, the element 40b entirely lying in the region outside of the image detection area 21a has a greater width than that of the element 40a in the image detection area 21a. This allows residual images in the region outside of the image detection area to be erased effectively, and artifacts arising from the residual images may be further prevented from developing.

So far the solid state radiation detector according to a preferred embodiment of the present invention has been described. But the present invention is not limited to the embodiment described above, and various modifications and changes may be made without departing from the spirit and scope of the present invention.

For example, only elements 42b (charge detecting linear electrodes) may be disposed in the region outside of the image detection area 21a without elements 43 (auxiliary linear electrodes) in the arranging direction of each element as shown in FIG. 3. In this case, the width of the elements 42b may be widened without constrained by the arranging pitch of the elements in the image detection area 21a.

Further, only elements 42a (charge detecting linear electrodes) may be disposed in the region outside of the image detection area 21a without elements 43 (auxiliary linear electrodes) in the longitudinal direction of each element. In this case, an extra fine wiring for electrically connecting the elements 43 to outside may be provided, and the length of the elements 43 in the longitudinal direction is not necessary aligned with that of the image detection area 21a and may be slightly longer.

Specific values of pixel pitch, width of each element, and spacing between the elements will be exemplified. First, specific example values in the case where both charge detecting linear electrodes and auxiliary linear electrodes are provided in the region outside of the image detection area will be illustrated.

Figure 4A:
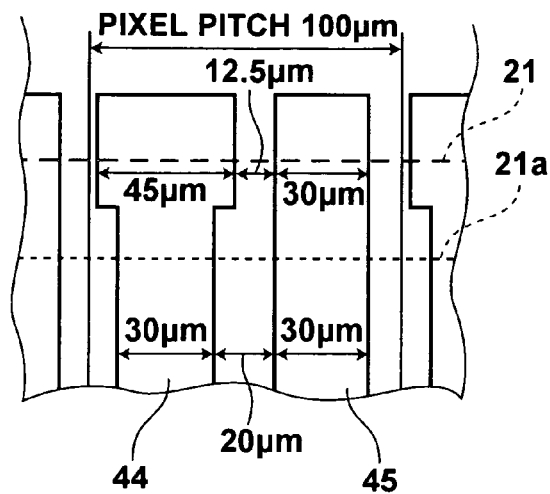
FIG. 4A is a top view of the second conductive layer, illustrating exemplary widths of respective elements thereof.

As shown in FIG. 4A, the pixel pitch may be 100 µm. In this case, the element 44 (charge detecting linear electrode) and element 45 (auxiliary linear electrode) may have the width of 30 µm respectively with the spacing of 20 µm between them in the image detection area 21a, and the width of 45 µm and 30 µm respectively with the spacing of 12.5 µm between them in the region outside of the image detection area 21a.

Figure 4B:
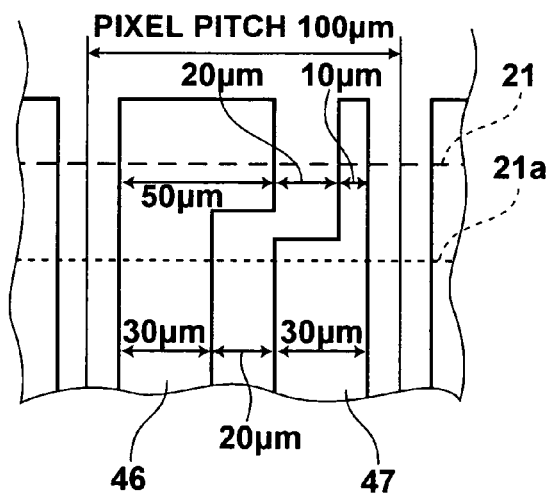
FIG. 4B is a top view of the second conductive layer, illustrating exemplary widths of respective elements thereof.

Alternatively, as shown in FIG. 4B, the element 46 (charge detecting linear electrode) and element 47 (auxiliary linear electrode) may have the width of 50 µm and 10 µm respectively with the spacing of 20 µm between them in the region outside of the image detection area 21a, with the pixel pitch and width of both elements 46, 47 in the image detection area 21a maintained unchanged from the embodiment shown in FIG. 4A.

Figure 4C:
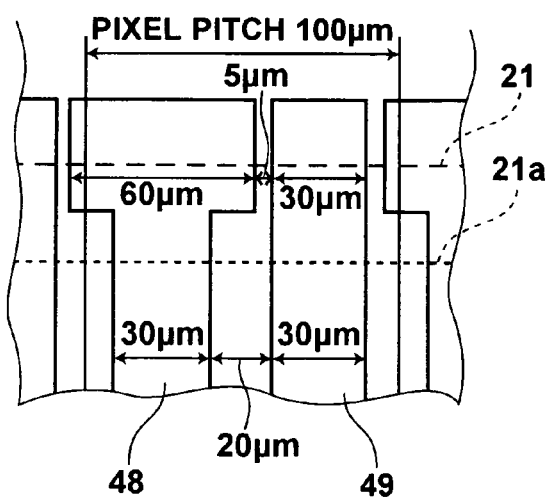
FIG. 4C is a top view of the second conductive layer, illustrating exemplary widths of respective elements thereof.

Further, as shown in FIG. 4C, the element 48 (charge detecting linear electrode) and element 49 (auxiliary linear electrode) may have the width of 60 µm and 30 µm respectively with the spacing of 5 µm between them outside of the image detection area 21a, with the pixel pitch, width of both elements 48, 49, and spacing between them in the image detection area 21a maintained unchanged from the embodiment shown in FIG. 4A.

Wider width of the charge detecting linear electrodes in the region outside of the image detection area 21a allows more effective erasure of residual images. Thus, the embodiment shown in FIG. 4C may provide the highest efficiency for the erasure of residual images among the embodiments shown in FIGS. 4A, 4B and 4C.

Hereinafter, specific example values in the case where only the charge detecting linear electrodes are disposed in the region outside of the image detection area will be illustrated.

Figure 5A:
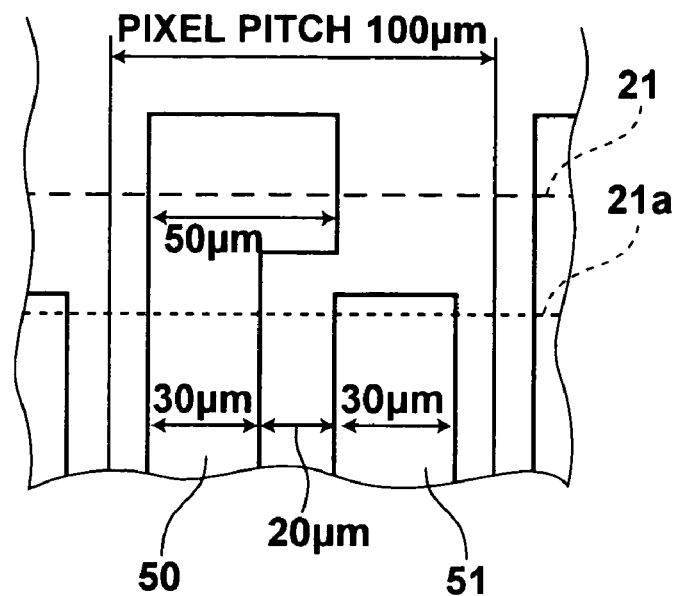
FIG. 5A is a top view of the second conductive layer, illustrating exemplary widths of respective elements thereof.

As shown in FIG. 5A, the pixel pitch may be 100 µm. In this case, the element 50 (charge detecting linear electrode) and element 51 (auxiliary linear electrode) may have the width of 30 µm respectively with the spacing of 20 µm between them in the image detection area 21a, and the element 50 may have the width of 50 µm in the region outside of the image detection area 21a.

Figure 5B:
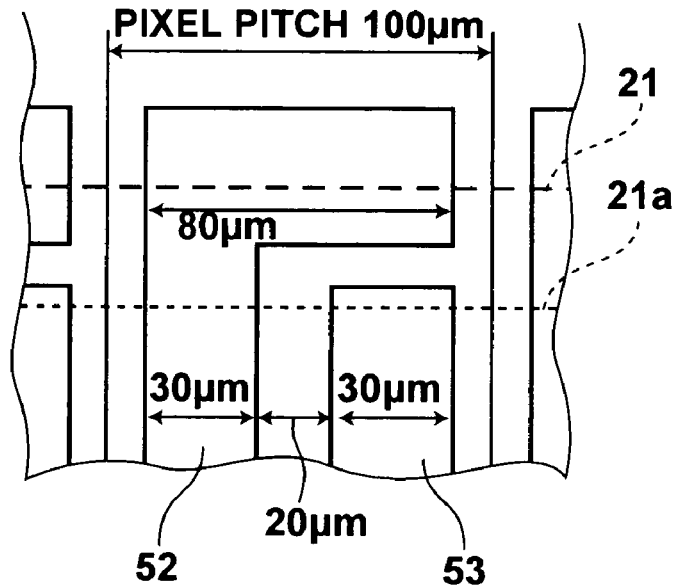
FIG. 5B is a top view of the second conductive layer, illustrating exemplary widths of respective elements thereof.

Alternatively, as shown in FIG. 5B, the element 52 (charge detecting linear electrode) may have the width of 80 µm in the region outside of the image detection area 21, with the pixel pitch, width of the element 52 and element 53 (auxiliary linear electrode), and spacing between them in the image detection area 21a maintained unchanged from the embodiment shown in FIG. 5A.

Wider width of the charge detecting linear electrodes in the region outside of the image detection area 21 allows more effective erasure of residual images. Thus, the embodiment shown in FIG. 5B may provide higher efficiency for the erasure of residual images than the embodiment shown in FIG. 5A.

In the detector according to the present invention, the recording photoconductive layer is configured to show conductivity when exposed to recording radiation. But the recording photoconductive layer of the detector according to the present invention is not necessary limited to this. It may be configured to show conductivity when exposed to light emitted through excitation by the recording radiation (reference is directed to Japanese Unexamined Patent Publication No. 2000-105297). In this case, a wavelength conversion layer is preferable to be provided on the surface of the first conductive layer. The wavelength conversion layer is what is known as the X-ray scintillator that converts recording radiation to light having a wavelength in a different wavelength region, such as blue light or the like. For the wavelength conversion layer, cesium iodide ($C_sI$) or the like may preferably be used. Further, the first conductive layer may be configured to have transparency to light excited by the recording radiation and emitted from the wavelength conversion layer.

Further, the detector according to the present invention is designed such that the charge transport layer is provided between recording photoconductive layer and reading photoconductive layer, and the storage section is formed at the interface between the recording photoconductive layer and charge transport layer. But the charge transport layer may be replaced by a trap layer. If the trap layer is used, latent image charges are captured by the trap layer, and stored in the trap layer or on the interface between the trap layer and recording photoconductive layer. Further, a microplate may be additionally provided for each pixel at the interface between the trap layer and recording photoconductive layer.

What is claimed is:

1. A solid state radiation detector comprising a set of layers layered in the order of:

a first conductive layer which is transparent to recording light;

a recording photoconductive layer that shows photoconductivity when exposed to recording light;

a storage section that stores charges as latent image charges in accordance with the luminous energy of recording light;

a reading photoconductive layer that shows photoconductivity when exposed to reading light; and a second conductive layer having a plurality of charge detecting linear electrodes, and a plurality of auxiliary linear electrodes, wherein:

when viewed from the layering direction, a region having a predetermined width extending inwardly from the outer edge of the first conductive layer is defined as the non-image-detection area, and a region other than the non-image-detection area of the first conductive layer is defined as the image detection area;

the charge detecting linear electrodes and auxiliary linear electrodes are disposed alternately in the image detection area;

the charge detecting linear electrode partly lying in the image detection area is formed such that the width in the non-image-detection area or in the region adjacent to the outer edge of the first conductive layer is greater than in the image detection area; and wherein the charge detecting linear electrode entirely lying in the region outside of the image detection area is formed to have a greater width than the width in the image detection area of the charge detecting linear electrode partly lying in the image detection area.

2. A solid state radiation detector according to claim 1, wherein each of the plurality of charge detecting linear electrodes are spaced apart from one another along the entire length of each of the electrodes.

3. The solid state radiation detector according to claim 2, wherein each of the plurality of auxiliary linear electrodes are spaced apart from one another along the entire length of each of the electrodes.

4. The solid state radiation detector according to claim 3, wherein the plurality of charge detecting linear electrodes and the plurality of auxiliary linear electrodes are of an identical length.

5. The solid state radiation detector according to claim 3, wherein the plurality of charge detecting linear electrodes extend beyond both ends of the plurality of auxiliary linear electrodes.

6. The solid state radiation detector according to claim 1, wherein the plurality of charge detecting linear electrodes are transparent to the reading light.

7. The solid state radiation detector according to claim 6, wherein the plurality of auxiliary linear electrodes are opaque to the reading light.

8. The solid state radiation detector according to claim 1, wherein the auxiliary linear electrode partly lying in the image detection area is formed such that the width in the non-image-detection area or in the region adjacent to the outer edge of the first conductive layer is smaller than in the image detection area.

9. The solid state radiation detector according to claim 1, wherein the auxiliary linear electrode partly lying in the image detection area is formed such that the width in the non-image-detection area is identical to the width in the image detection area.

* * * * *